(No Model.)
J. W. PORRITT.
PULLEY HEAD.
No. 306,952. Patented Oct. 21, 1884.
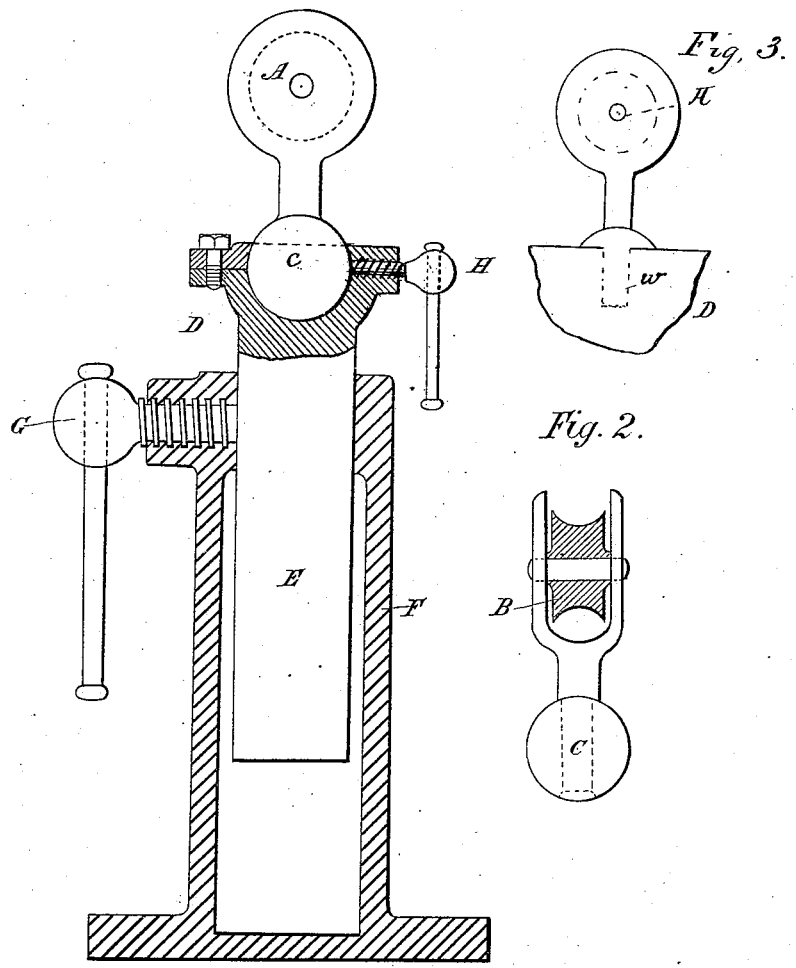

UNITED STATES PATENT OFFICE.

JAMES WILLIAM PORRITT, OF CLEY, ENGLAND.

PULLEY-HEAD.

SPECIFICATION forming part of Letters Patent No. 306,952, dated October 21, 1884.

Application filed August 13, 1884. (No model.)

*To all whom it may concern:*

Be it known that I, JAMES WILLIAM PORRITT, a subject of the Queen of England, residing at Cley, England, have invented a new and useful Pulley Head or Attachment, of which the following is a specification.

This invention is an improvement upon that described in a previous application filed by me, Serial No. 139,704.

It consists of a pulley which will turn in any required direction and adapt itself as needed to the direction of the rope, &c., but which can be fixed in any requisite position when needed.

In the accompanying drawings, Figure 1 is an elevation, partly in section, of this device; Fig. 2, a view of the pulley and ball at right angles to that shown in Fig. 1. Fig. 3 is a view of a modification.

A is the shell or jaw which carries the pulley B, the shell A being joined by a short neck with the ball C. A suitable socket, D, is provided and secured in any suitable manner or position. In Fig. 2 it is shown forming a head to the bar E, which fits into the trunk F, where it may be secured by the set-screw G or in other convenient manner. The ball may be fixed in its socket by the screw H or an equivalent device. Thus by combining with the pulley the well-known ball-and-socket joint I am able to produce a pulley which can turn in any requisite direction and will adapt itself to the pull of the rope; but when desired it can be fixed by means of the screw H. The trunk F can be sunk in the ground. A vertical slot is provided in the side of the socket of joint to allow greater inclination of the head, (see W, Fig. 3.)

Having now described the said invention, I wish it to be understood that I claim and desire to protect by United States Letters Patent—

1. The combination, with a pulley, B, of the ball-and-socket joint C D, substantially as and for the purpose specified.

2. The combination, with the bar E, of the ball-and-socket joint C D, the ball having attached to it the jaws which carry the pulley B, substantially as specified.

3. The combination, with the ball and socket, of the screw H, for the purpose of fixing the ball in its socket, substantially as specified.

In testimony whereof I have hereto set my hand in the presence of two subscribing witnesses.

JAMES WILLIAM PORRITT.

Witnesses:
BERNHARD DUKES,
CHAS. BERKLEY HARRIS.